(12) United States Patent
Riegel

(10) Patent No.: US 6,901,813 B2
(45) Date of Patent: Jun. 7, 2005

(54) FLOW METER ALARM DEVICE

(75) Inventor: David P. Riegel, Landisville, PA (US)

(73) Assignee: World Wide Plastics, Inc, Trevose, PA (US)

( * ) Notice: Subject to any disclaimer, the term of this patent is extended or adjusted under 35 U.S.C. 154(b) by 0 days.

(21) Appl. No.: 10/437,165

(22) Filed: May 13, 2003

(65) Prior Publication Data

US 2004/0226388 A1 Nov. 18, 2004

(51) Int. Cl.[7] .............................................. G01F 1/22
(52) U.S. Cl. .................................................. 73/861.57
(58) Field of Search ........................ 73/861.57, 861.56, 73/861.58

(56) References Cited

U.S. PATENT DOCUMENTS

| 3,150,360 | A |   | 9/1964  | Stenzel          |         |
|-----------|---|---|---------|------------------|---------|
| 3,841,156 | A | * | 10/1974 | Wolfe            | 73/291  |
| 4,014,010 | A |   | 3/1977  | Jinotti          |         |
| 4,051,723 | A |   | 10/1977 | Head et al.      |         |
| 4,167,115 | A |   | 9/1979  | Stoever          |         |
| 4,550,314 | A |   | 10/1985 | Stenzel et al.   |         |
| 4,566,337 | A | * | 1/1986  | Smart            | 73/861.56 |
| 4,774,676 | A |   | 9/1988  | Stenzel et al.   |         |
| 4,781,066 | A | * | 11/1988 | Pope et al.      | 73/239  |
| 5,142,271 | A |   | 8/1992  | Bailey et al.    |         |
| 6,231,064 | B1 | * | 5/2001  | Curry           | 280/407 |
| 6,339,959 | B1 | * | 1/2002  | Natapov         | 73/239  |
| 6,539,814 | B1 | * | 4/2003  | Popp et al.     | 73/861.56 |
| 6,668,643 | B1 | * | 12/2003 | Pettinaroli et al. | 73/239 |

* cited by examiner

Primary Examiner—Edward Lefkowitz
Assistant Examiner—Jewel V. Thompson
(74) Attorney, Agent, or Firm—Volpe and Koenig, P.C.

(57) ABSTRACT

A flow meter alarm device easily attached to and removed from a flow meter at various locations along the length of the flow meter. The device is compatible with flow meters which have a float for measuring flow velocity. The device preferably has two housings, extending from a third housing having a display surface, that define an area for receiving a flow meter. The extending housings are preferably drawn together by a threaded member thereby clamping the device onto the flow meter. A sensor mounted on the device, preferably an optical emitter coupled with an optical receiver, is able to detect the float. When the float is detected, a signal is produced by the device notifying that the flow rate has fallen outside a desired range. The device is adjustable to function with flow meters of various different dimensions.

55 Claims, 5 Drawing Sheets

FLOW METER ALARM DEVICE

FIELD OF INVENTION

The present invention relates to flow meters. More particularly, the present invention relates to a novel device easily attached to and removed from a flow meter for signaling when flow rates reach a selected value.

BACKGROUND

Conventional flow meters typically utilize a float member moveable along the flow meter housing. Such movement may or may not be guided by a float rod. In either case, the float moves to a position representative of flow rate.

In general, the flow rate is determined by visual inspection without automated systems for signaling when flow rate falls outside a desired range.

It is desirable to provide a device easily attached to and removed from a flow meter to signal changes in flow rate, especially critical changes, and further to have a device which may accommodate flow meters of different sizes.

SUMMARY

The present invention provides a device designed to be easily mounted upon and removed from a flow meter, without disturbing the flow meter as installed, to signal when flow rates reach a given reading and/or fall outside of a desired range. Spacer members, designed for mounting on the device, enable use of the device with a number of flow meters of different sizes.

BRIEF DESCRIPTION OF THE DRAWINGS

The present invention will be understood from a consideration of the drawings wherein like elements are designated by like numerals and, wherein.

DETAILED DESCRIPTION OF THE PREFERRED EMBODIMENTS

To facilitate an understanding of the present invention, the invention will be described with reference to a rotameter or variable area type flow meter. However, those of skill in the art will realize that the device embodying the teachings of the present invention is usable with any type of flow measuring device that utilizes a float.

Figures 1, 2:
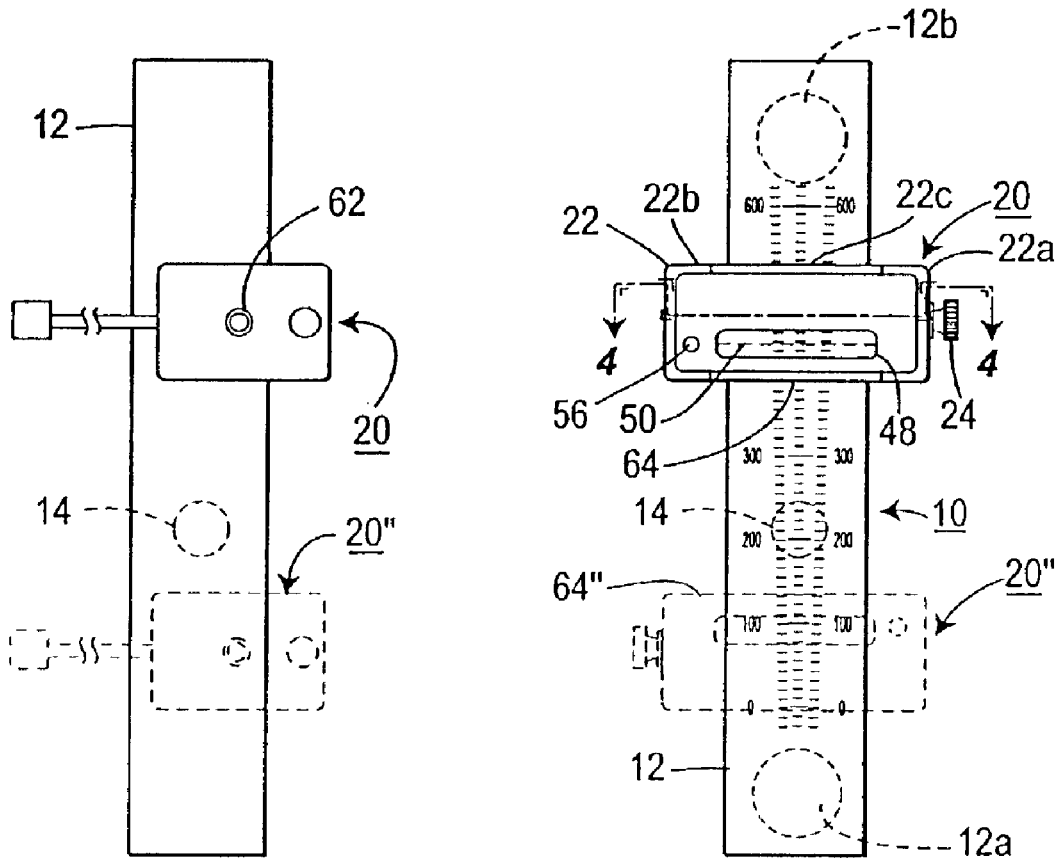
FIGS. 1, 2 and 3 respectively show front, side, and top views of a device embodying the principles of the present invention in combination with a flow meter.
Figure 3:
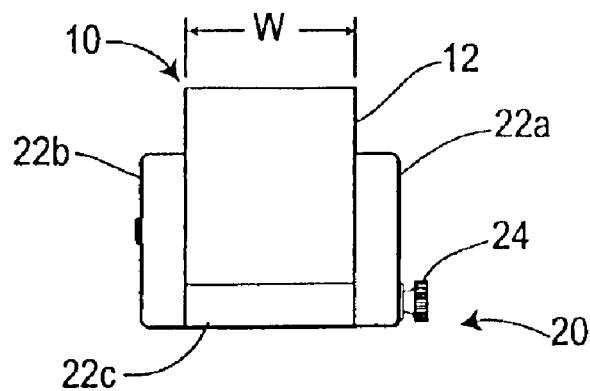

Making reference to FIGS. 1–3, a flow meter 10 is shown therein comprising a hollow, rectangular-shaped outer flow meter body 12 formed of a material having at least a transparent portion enabling viewing of the float 14. The float 14 is free to travel along the length of the flow meter. Flow meter 10 is adapted to be connected with a flow source via inlet 12a and outlet 12b. Fluid flow rate through the flow meter 10 is measured by means of float 14 which moves toward outlet 12b as flow velocity increases, the flow rate being determined by graduations provided along the rotameter housing.

Figure 9:
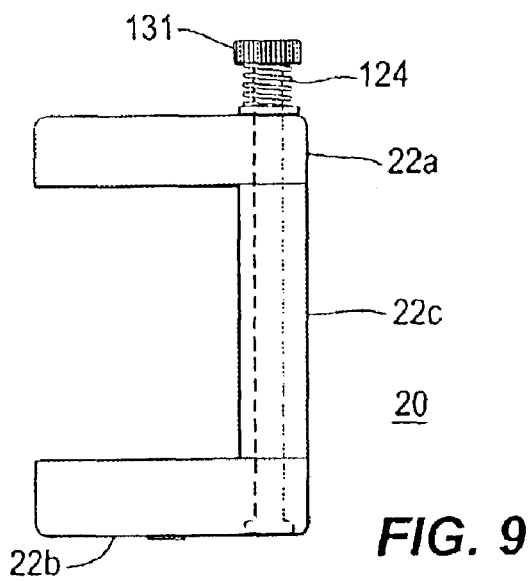
FIG. 9 is a top view of an alternative embodiment of the present invention.
Figure 8:
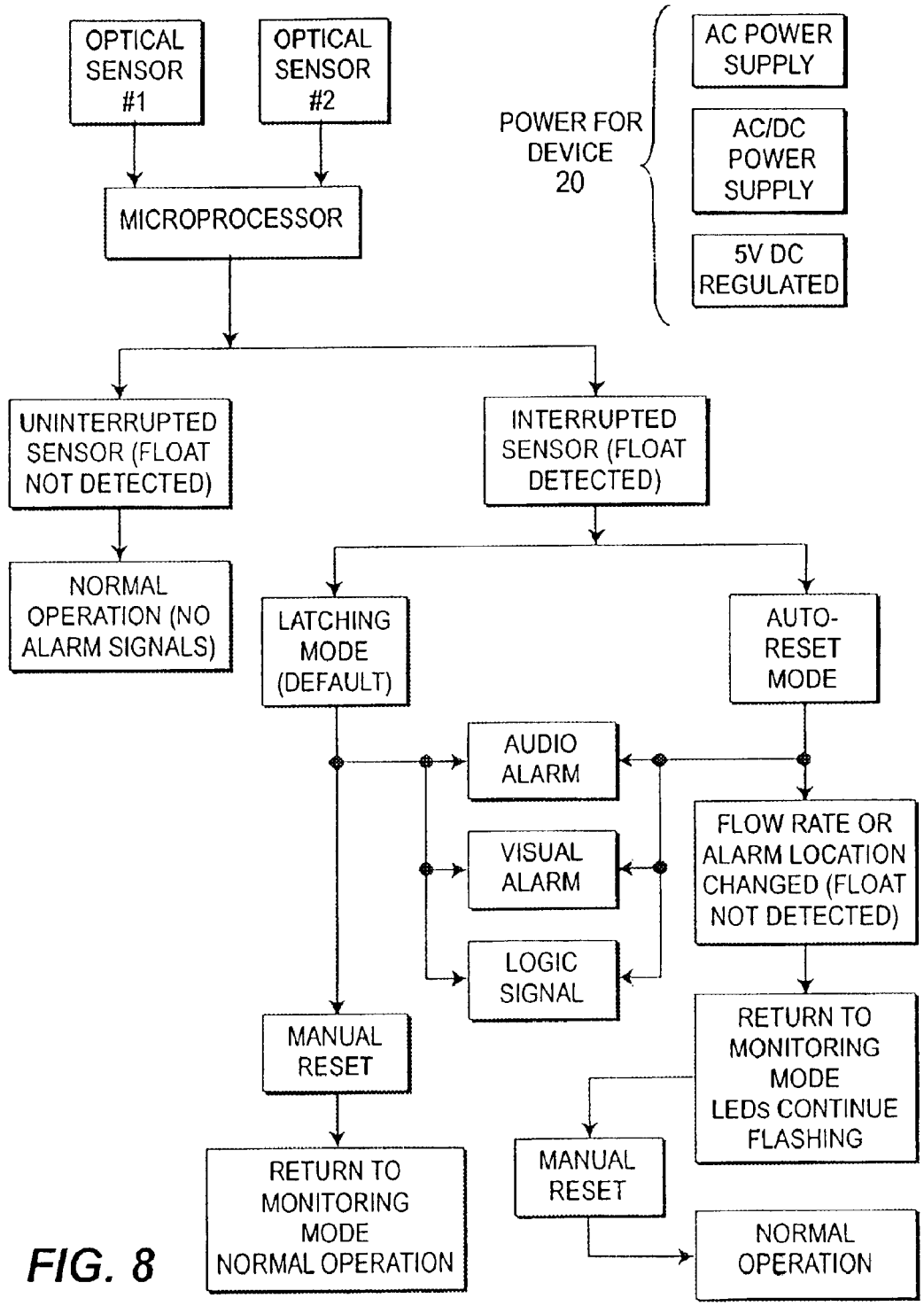
FIG. 8 is a flow diagram showing the two operating sequences of the device of FIG. 1.

In a preferred embodiment, the device 20 comprises housing assembly 22 which includes a first housing 22a, a second housing 22b, and a third housing 22c. Housings 22a and 22b are drawn toward one another to secure the device 20 to flow meter housing 12 by means of a clamping force. The clamping force is provided by screw 24 which threadedly engages a tapped opening 26b in a clamping pin 26 extending through third housing member 22c. The head 26a of pin 26 rests on a circular shoulder 31a in member 31, while the circular flange 24a of screw 24 rests against the outer surface of member 33, to draw the first housing 22a and second housing 22b toward each other thereby securely attaching device 20 to flow meter housing 12. Loosening screw 24 allows the device to be easily removed and/or re-positioned along the length of flow meter housing 12. Screw 24, in the preferred embodiment is a thumbscrew, although any similar threaded fastener could be used. As an alternative embodiment, referring to FIG. 9, a spring 124, in combination with a pin 131 extending through housings 22a–22c, exerts a force on housings 22a and 22b to draw the first and second housings together thereby eliminating the need for a screw. As another alternative embodiment, the first and second housings (22a,22b) could remain fixed, and the device frictionally secured by a threaded member threadedly engaging a tapped opening located on one of the first or second housings, one end of the threaded member making direct contact with flow meter housing 12. The threaded member may be provided with a rubber or rubber-like end cap to prevent the flow meter housing from being damaged and to enhance the frictional engagement.

Figure 4:
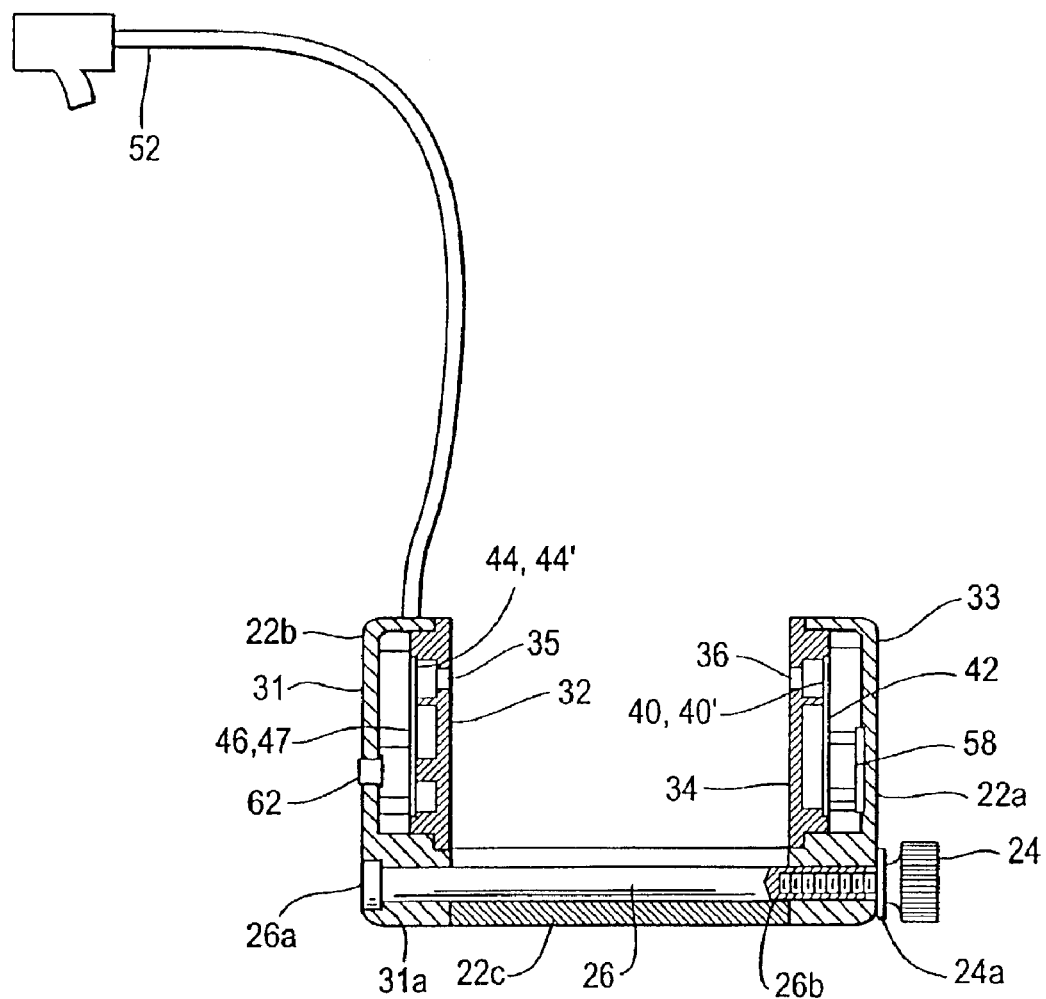
FIG. 4 is a sectional view of the device of FIG. 1, omitting the flow meter, looking in the direction of arrows 4—4.
Figure 5:
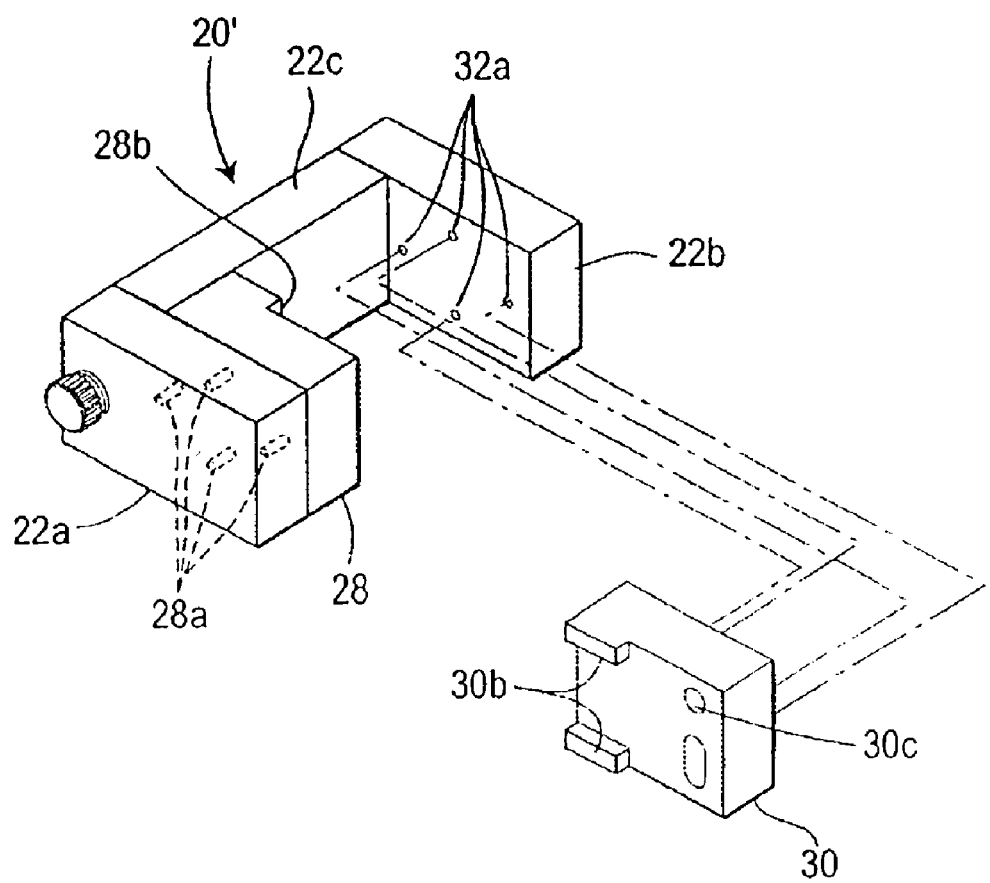
FIG. 5 is an isometric view of the device of FIG. 1 in combination with a first and second spacer block.
Figure 6:
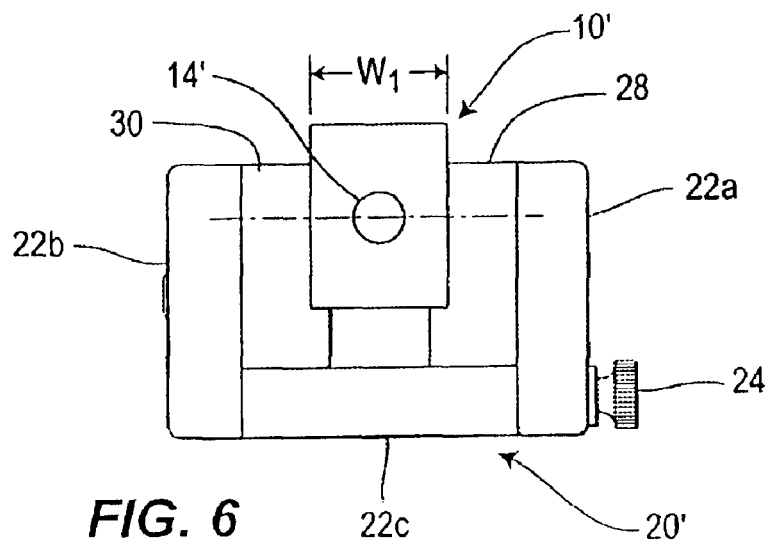
FIG. 6 is a top view of the device of FIG. 1 in combination with the first and second spacer blocks to accommodate a flow meter having outer dimensions which differ from the flow meter of FIGS. 1–3.

Making reference to FIGS. 4–6, in applications where the device 20 is intended for use with a flow meter having smaller dimensions than that shown in FIGS. 1–3, spacer blocks 28 and 30 are respectively attached to covers 32 and 34 each of which forms part of the housings 22b,22a. Projections 28a and 30a provided on spacer blocks 28 and 30 are sized to mate with openings in their associated covers, such as opening 32a in cover 32, to provide an aligned snap fit therebetween. Device 20', fitted with spacer blocks may be attached to a flow meter 10', functionally similar to flow meter 10 but having a width $W_1$ smaller than the width W of flow meter 10. Ledges 30b and 28b also assist in properly aligning the sensors of device 20' with the path of movement of float 14' of the flow meter 10'. Screw 24 is tightened to provide a clamping force to secure device 20' onto flow meter 10' in the same manner as described above with respect to flow meter 10. Clearance apertures such as the apertures 30c in the spacer blocks 28 and 30 provide for the passage of light from emitters 40, 40' to receivers 44, 44'. Similar clearance apertures 35,36 are provided in covers 32 and 34, which are also aligned with the emitter and receiver. Spacer blocks of different dimensions can be used to accommodate flow meters of different dimensions. As an alternative embodiment, spacer blocks could be attached to housings 22a and 22b via T-shaped slots in the housings which cooperate with mating T-shaped protrusions on the spacer blocks.

Other flow meters having widths only slightly different from the width of the first flow meter can be accommodated by the device without use of the spacer blocks. The screw 24, in cooperation with the clamping pin 26, allows for some variation in flow meter width.

Figure 5A:
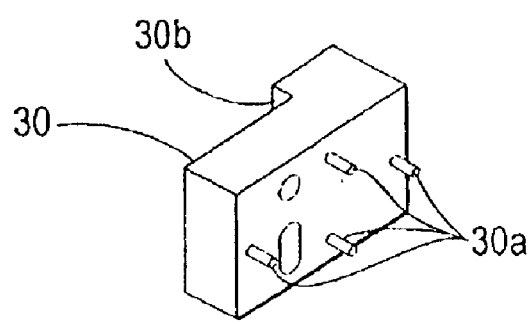
FIG. 5a is an isometric view of the second spacer block.

As an alternative embodiment, housing 22c and pin 26 may be made shorter and screw 24 may be lengthened to provide greater adjustment range in width. This would provide a greater range of travel of the housing 22a relative to housing 22b, allowing the device to be affixed to different sized flow meters without the use of spacer blocks. It should further be noted that the spacer blocks, in addition to accommodating flow meters of differing widths, also provide for alignment of the emitter and receiver with the float 14, by way of the ledges, such as the ledges 30b shown in FIGS. 5 and 5a.

Figure 7:
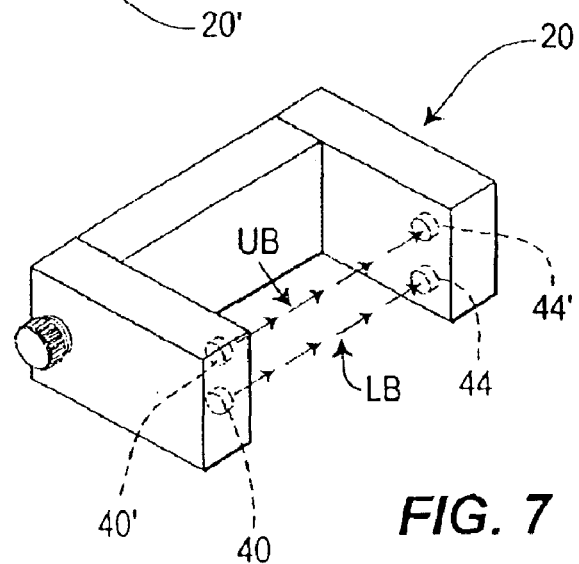
FIG. 7 is an isometric view of the device of FIG. 1, showing the beams directed by the emitters to their associated receivers.

Making reference to FIGS. 1, 4, and 7, housing 22a, comprised of covers 33 and 34, contains optical emitters 40, 40' mounted on a circuit board 42. Optical emitters 40,40' cooperate with optical receivers 44,44' and a microprocessor 47, mounted on circuit board 46, provided in housing 22b comprised of covers 31 and 32. Emitters 40,40' respectively direct light to receivers 44,44'. Cover 34 protects the optical emitters and associated circuitry and provides a surface to interface with the flow meter housing 12 or a spacer block 28. Similarly, cover 32 protects the optical receivers and provides a second surface to interface with the flow meter housing 12 or second spacer block 30. Apertures 35 and 36 in covers 32 and 34 (together with clearance apertures in the spacer blocks) respectively allow the transmission of light between the emitters 40,40' and receivers 44,44'. Alternatively, the optical emitters may be located in the housing 22b and the optical receivers located in housing 22a. Alternatively, the emitters and receivers may be located in the same housing 22a or 22b and employ a reflective technique to detect the presence of float 14. Further, those skilled in the art will recognize that other types of sensors including magnetic, inductive, capacitive, and ultrasonic may be used to detect the presence of the float 14. Depending on the type of sensor used, the sensor and associated electronics may be housed in housing 22c with housings 22a and 22b serving as purely structural elements.

A signal line 50 inscribed on a transparent sight window 48 provided in housing 22c indicates the position where float 14 will enter the light beam emitted by the optical emitters 40,40' and directed to the optical receivers 44,44'. The transparent window also enables graduations and/or numeric legends on the flow meter to be easily viewed. Signal line 50 enables the user to accurately position the device 20 at a desired location along flow meter housing 12. The emitter 40, receiver 44, and sight window 48, in one embodiment, are displaced from a center line (note line 4—4 of FIG. 1) and are preferably located near edge 64 on housing 22c. This enables two devices to be mounted as close as possible to one another enabling the threshold settings represented by the sensing lines to be positioned as close as possible when two devices are being used on the same flow meter.

A second device 20" shown in dotted fashion in FIG. 1, may be mounted upon flow meter 10 with its edge 64" facing edge 64 of the first device 20. Using this orientation the devices 20 and 20" and especially the sensing lines, may be positioned close to one another.

Power is supplied to device 20 from a suitable source (not shown) and logic is outputted from device 20 to a remote data collection device (not shown) via the power and logic connector 52. In the preferred embodiment, power and logic connector 52 extends from one end of housing 22b remote from the housing 22c. If desired, the power and logic connector 52 can extend from housing 22a or from housing 22c. In still another embodiment, a battery may be provided in the device 20 to supply power and the logic (binary) output function can be omitted or provided via wireless means.

Making reference to FIGS. 1, 4, 6, and 7, display 56 is comprised of a red LED and a green LED arranged behind a translucent window and located on the housing 22c adjacent to the transparent window. When power is supplied to the device, the green LED is illuminated and the device is operational in a latching mode. In latching mode, when the float enters the beam created by emitter 40, an audible alarm 58 located on circuit board 42 sounds, the red LED is illuminated, and the logic output changes state i.e. one binary state for normal, opposite binary state for abnormal. The logic (binary) output is conveyed through the power and logic connector 52 and may be coupled to various types of data collection and computer systems recognized and well known by those skilled in the art. The device returns to normal operation only after the reset button 62, extending outwardly from housing 22b, is manually pressed to reset device 20. Note that the second emitter 40' and receiver 44' are not required for the device to operate in latching mode.

By pressing and holding the reset button 62 for a given interval when power is applied to device 20, the device operates in auto-reset mode. In auto-reset mode, the device utilizes both emitters 40,40' and receivers 44, 44' to determine both the float location and its direction of movement by way of an internal program provided in microprocessor 47, coupled to receivers 44,44'. Emitter 40 and emitter 40' are positioned in close proximity to each other such that float 14 is able to enter upper beam UB and lower beam LB substantially simultaneously. Beams UB and LB are represented by broken center lines extending between their respective emitter and receiver. It should be noted that the sensing line 50 is substantially parallel to the beam LB, for example, to facilitate adjustment of the device 20 along the flow meter 10. In auto-reset mode, when the float enters the lower beam LB created by emitter 40, the audible alarm 58 sounds, the red LED is illuminated, and the logic output changes state. If float 14 continues to move upward into the beam UB and is displaced from beam LB, the logic output remains unchanged and the audible alarm continues. If float 14 moves downward and is initially displaced from beam UB and thereafter leaves beam LB, the internal program in the microprocessor 47 determines that float 14 moved below beam UB, thereby turning off the audible alarm and providing a logic output indicating normal operation, responsive thereto. Thereafter, the green and red LEDs will flash until the reset button 62 is pressed.

A variety of different procedures could be used for returning the device to normal operation after the float is sensed, such as employing a timer so no user intervention is required. Also, other methods of signaling that the float has been sensed, such as a wireless radio transmission, are readily recognized by those skilled in the art. Those skilled in the art will further recognize that the reset button 62, the LED display 56, and the audible alarm 58 could be located on the housing 22c, or alternatively, on any other suitable location on the device.

What is claimed is:

1. A device, for use with flow meters of a type having a movable float that indicates a rate of flow through the flow meter, having a given width between two opposing sidewalls and measured in a direction transverse to a path of movement of the float, comprising:

a housing assembly including at least one sensor that provides an output when the float is in close proximity to the sensor, the housing assembly also including opposing first and second housings, connected by a third housing, defining a recess for receiving a flow meter and having a recess width at least as large as said given width enabling the housing assembly to be releasably attached to and removable from the flow meter without disconnecting the flow meter from a fluid inlet or fluid outlet by movement of the housing assembly in a direction transverse to the path of movement of the float;

means for applying a force to at least one of the opposing first and second housings to releasably secure the device to a flow meter; and, a signal generator in said housing assembly providing a signal responsive to said sensor output.

2. The device according to claim 1, wherein said sensor comprises a first emitter/receiver combination including a first emitter and a first receiver which cooperates with the first receiver to detect the float.

3. The device according to claim 2, wherein said sensor further comprises a second emitter/receiver combination including a second emitter and a second receiver which cooperates with the first emitter/receiver combination to detect a direction of movement of the float.

4. The device according to claim 2, wherein said first emitter and first receiver are of optical design.

5. The device according to claim 1, wherein said means for applying a force includes a threaded member which threadedly engages a tapped opening in the first housing, the threaded member having an end making direct contact with the flow meter to secure the device to the flow meter.

6. The device according to claim 1, wherein said means for applying a force includes a spring which applies force to the opposing first and second housings to draw the first and second housings together.

7. The device according to claim 1, wherein said means for applying a force includes a threaded member cooperating with a tapped member in said housing assembly to draw the opposing first and second housings together.

8. The device according to claim 1, wherein the signal is an audible alarm.

9. The device according to claim 1, wherein the signal is a light.

10. The device according to claim 1, wherein the signal is a logic output.

11. A device, for use with flow meters of a type having a movable float that indicates a rate of flow through the flow meter, and having a given width between two opposing sidewalls and measured in a direction transverse to a path of movement of the float, comprising:

a housing assembly including at least one sensor that provides an output when the float is in close proximity to the sensor, the housing assembly also including opposing first and second housings, connected by a third housing, defining a recess having a width at least as large as said given width enabling the device to be releasably attached to a flow meter without disconnecting the flow meter from a fluid inlet or fluid outlet;

means for applying a force to at least one of the opposing first and second housings to releasably secure the device to a flow meter; and, a signal generator in said housing assembly providing a signal responsive to said sensor output; and including means for reducing the width of the recess to accommodate flow meters having different widths.

12. A device, for use with flow meters of a type having a movable float that indicates a rate of flow through the flow meter, and having a given width between two opposing sidewalls and measured in a direction transverse to a path of movement of the float, comprising:

a housing assembly including at least one sensor that provides an output when the float is in close proximity to the sensor, the housing assembly also including opposing first and second housings, connected by a third housing, defining a recess having a width at least as large as said given width enabling the device to be releasably attached to a flow meter without disconnecting the flow meter from a fluid inlet or fluid outlet;

means for applying a force to at least one of the opposing first and second housings to releasably secure the device to a flow meter; and, a signal generator in said housing assembly providing a signal responsive to said sensor output; and wherein said recess enables the device to be selectively positioned along a path of the float.

13. The device according to claim 12, wherein the housing assembly further includes a viewing window provided with a signal line to facilitate alignment of the device along the path of the float.

14. A device for use with various flow meters, each having a different width and each having a float that indicates a rate of flow through the flow meter, each said width being measured in a direction transverse to a path of movement of said float, the device comprising:

a housing assembly including at least one sensor that generates an output when the float is in close proximity to the sensor, the housing assembly also including opposing first and second housings, a third housing connected between said first and second housings to form a substantially U-shaped configuration and defining a recess, a width of the recess being adjustable to enable the device to embrace flow meters of varying width; and, a signal generator responsive to said sensor output to provide an alarm condition.

15. The device according to claim 14, wherein said sensor comprises a first emitter and a first receiver which cooperates with the emitter.

16. The device according to claim 15, wherein said sensor further comprises a second emitter and a second receiver which cooperates with the second emitter, and wherein the first and second emitters and receivers cooperate to detect a direction of movement of the float.

17. The device according to claim 15, wherein said first emitter and first receiver are of optical design.

18. The device according to claim 15, wherein said recess is designed to enable the device to be slidably mounted and removed without the need to disassemble the device.

19. The device according to claim 18, wherein said housing assembly further includes a transparent window having a signal line that facilitates alignment of the device along the path of the float.

20. The device according to claim 19, wherein said signal line is substantially parallel to an imaginary center line extending between the emitter and the receiver.

21. The device according to claim 20, wherein the signal line is offset from a center line of the device and is positioned closer to one edge of the housing.

22. The device according to claim 14, wherein said housing assembly further includes means for releasably securing the device to a flow meter embraced by said device.

23. The device according to claim 14, wherein the first and second housings are releasably secured to the flow meter by a clamping device, comprising a threaded member which operates to draw the first and second housings together.

24. The device according to claim 14, wherein said housing assembly further includes a threaded member for drawing the opposing first and second housings together to adjust the width of the recess and secure the device to a flow meter.

25. The device according to claim 14, further comprising at least one spacer block connected to the device and positioned between the opposing first and second housings to adjust the width of the recess and secure the device to a flow meter.

26. The device according to claim 25, wherein said spacer block includes protrusions, and wherein the first and second housings include apertures which receive the protrusions to align and secure the at least one spacer block to the device.

27. The device according to claim 25, wherein said spacer block includes at least one ledge to align the device on the flow meter with the path of the float such that the at least one sensor is positioned to accurately detect the float.

28. The device according to claim 14, wherein the signal is an audible alarm.

29. The device according to claim 14, wherein the signal is a light.

30. The device according to claim 14, wherein the signal is a logic output.

31. A combination flow meter and device unit, comprising:
    a flow meter having a movable float that indicates a rate of flow through the flow meter, the flow meter also having a given width measured in a direction transverse to a path of movement of the float and being respectively connected to a fluid inlet and a fluid outlet; and,
    a device having a housing assembly including at least one sensor that provides an output when the float is in close proximity to the sensor, the housing assembly also including opposing first and second housings, connected by a third housing, defining a recess for receiving said flow meter, having a width at least as large as the width of the flow meter, that enables the device to be easily attached to and removed from the flow meter without disconnecting the flow meter from the fluid inlet or fluid outlet by moving the housing assembly in a direction transverse to said path of movement, the device further having means for applying a force to the opposing first and second housings to releasably secure the device to the flow meter.

32. The combination unit according to claim 31, wherein said sensor comprises a first emitter/receiver combination including a first emitter and a first receiver which cooperates with the first receiver to detect the float.

33. The combination unit according to claim 32, wherein said sensor further comprises a second emitter/receiver combination including a second emitter and a second receiver which cooperates with the second emitter to detect the float, and wherein the second emitter/receiver combination cooperates with the first emitter/receiver combination to detect a direction of movement of the float.

34. The combination unit according to claim 31, wherein said means for applying a force includes a threaded member which threadedly engages a tapped opening in one of said first and second housings, the threaded member contacting a sidewall of the flow meter to secure the device to the flow meter.

35. The combination unit according to claim 31, wherein said means for applying a force includes a spring which applies force to the opposing first and second housings to draw the first and second housings together.

36. The combination unit according to claim 31, wherein said means for applying a force includes a threaded member cooperating with a tapped member in said housing assembly to draw the opposing first and second housings toward one another.

37. The combination unit according to claim 31, wherein said recess enables the device to be slideably moved in directions aligned with and transverse to a length of the flow meter.

38. The combination unit according to claim 31, wherein said housing assembly further includes a viewing window provided with a signal line that facilitates alignment of the device along the length of the flow meter.

39. The combination unit according to claim 31, wherein the signal is an audible alarm.

40. The combination unit according to claim 31, wherein the signal is a light.

41. The combination unit according to claim 31, wherein the signal is a logic output.

42. A combination flow meter and device units comprising:
    a flow meter having a movable float that indicates a rate of flow through the flow meter, the flow meter also having a liven width measured in a direction transverse to a path of movement of the float and being respectively connected to a fluid inlet and a fluid outlet;
    a device having a housing assembly including at least one sensor that provides an output when the float is in close proximity to the sensor, the housing assembly also including opposing first and second housings, connected by a third housing, defining a recess, having a width at least as large as the width of the flow meter, that enables the device to be easily attached to and removed from the flow meter without disconnecting the flow meter from the fluid inlet or fluid outlet, the device further having means for applying a force to the opposing first and second housings to releasably secure the device to the flow meter; and
    further comprising at least one spacer block, positioned between the opposing first and second housings, for adjusting a width of the recess.

43. The combination unit according to claim 42, wherein said spacer block includes protrusions, and wherein the first and second housings include apertures which receive the protrusions to align and secure the at least one spacer block to the device.

44. The combination unit according to claim 43, wherein said spacer block includes at least one ledge to properly position the flow meter within said recess to align the at least one sensor with the path of the float such that the at least one sensor is positioned to detect the float.

45. An alarm device for use with flow meters, comprising:
    a substantially U-shaped housing assembly composed of first and second housings each joined near one end to a third housing forming the U-shaped configuration;
    a sensor mounted in one of said first and second housings for sensing a movable member in a flow meter to provide an alarm condition;
    opposing surfaces of said first and second housings positioned to embrace opposing sidewalls of a flow meter, said opposing surfaces having shapes conforming to a shape of the flow meter opposing sidewalls enabling the device to be slidable along said opposing sidewalls in first and second directions transverse to one another; and, means for releasably clamping the device to a flow meter by exerting a clamping force only on said opposing sidewalls.

46. The alarm device according to claim 45, further comprising a plurality of spacers of differing thickness and each designed to be releasably joined to at least one of said opposing surfaces to accommodate flow meters of differing widths measured between said opposing sidewalls.

47. A method of providing a signal responsive to a rate of flow as indicated by a flow meter of a type having a movable float, the flow meter having a given width between two opposing sidewalls measured in a direction transverse to a path of movement of the float, the method comprising:

placing a housing assembly on the flow meter, the housing assembly including at least one sensor that provides an output when the float is in close proximity to the sensor, the housing assembly also including opposing first and second housings, connected by a third housing, defining a recess having a width at least as large as said given width, enabling the housing assembly to receive the flow meter within the recess and to be releasably attached to the flow meter without disconnecting the flow meter from a fluid inlet or a fluid outlet and moving the housing assembly in a direction transverse to the path of movement of said float;

applying a force to at least one of the opposing first and second housings to releasably secure the device to a flow meter; and generating a signal responsive to said sensor output.

48. The method of claim 47, wherein the generating step generates at least one of an audio and a visual signal.

49. The method of claim 47, wherein the step of applying a force includes the step of turning a threaded member cooperating with a tapped member in said housing assembly to draw the opposing first and second housings together.

50. The method of claim 47, wherein the step of placing the housing assembly includes the step of aligning the device along a path of the float using a viewing window located on the housing assembly.

51. A method of providing a signal responsive to a rate of flow as indicated by a flow meter of a type having a movable float, the flow meter having a given width between two opposing sidewalls measured in a direction transverse to a path of movement of the float, the method comprising:

placing a housing assembly on the flow meter, the housing assembly including at least one sensor that provides an output when the float is in close proximity to the sensor, the housing assembly also including opposing first and second housings, connected by a third housing, defining a recess having a width at least as large as said given width, enabling the housing assembly to receive the flow meter within the recess and to be releasably attached to the flow meter without disconnecting the flow meter from a fluid inlet or a fluid outlet;

applying a force to at least one of the opposing first and second housings to releasably secure the device to a flow meter;

generating a signal responsive to said sensor output and;

wherein the step of placing the housing assembly includes the step of inserting at least one spacer block between the opposing first and second housings to reduce the width of the recess to accommodate a flow meter of reduced size.

52. A method of providing a signal responsive to a rate of flow as indicated by a flow meter of a type having a movable float, the flow meter having a given width between two opposing sidewalls measured in a direction transverse to a path of movement of the float, the method comprising:

placing housings of first and second sensing devices on the flow meter, each housing including at least one sensor that provides an output when the float is in close proximity to the sensor, each housing having a recess for receiving the flow meter, and releasably securing the first and second sensing devices to the flow meter; and slideably moving the housings along the flow meter to provide signals for different flow rates.

53. The method of claim 52, wherein the step of slideably moving the housings includes the step of providing viewing windows, located on each of the housings and substantially aligned with respective beams created by their associated sensors, to facilitate alignment of each of the devices along the path of the float.

54. The method of claim 53, further comprising providing each viewing window with a signal line displaced from a longitudinal central axis of its associated housing so that the signal line is closer to one edge of its associated housing and further away from an opposite edge of its associated housing, and mounting the housings upon the flow meter in orientations to enable the viewing windows to be positioned closer to one another than in another orientation.

55. The method of claim 53, wherein providing each viewing window further comprises providing each viewing window to be of a size sufficient to view graduations and indicia on the flow meter to further facilitate alignment of each device at a desired location along the flow meter.

* * * * *

UNITED STATES PATENT AND TRADEMARK OFFICE
CERTIFICATE OF CORRECTION

PATENT NO. : 6,901,813 B2  Page 1 of 1
DATED : June 7, 2005
INVENTOR(S) : David P. Riegel It is certified that error appears in the above-identified patent and that said Letters Patent is hereby corrected as shown below:

<u>Column 8,</u>
Line 21, after the word "device", delete "units" and insert therefor -- unit, --.
Line 25, after the words "having a", delete "liven" and insert therefor -- given --.

Signed and Sealed this

Eighth Day of November, 2005

JON W. DUDAS
*Director of the United States Patent and Trademark Office*